(12) United States Patent
Rashkovskiy (10) Patent No.: US 8,959,449 B2
(45) Date of Patent: Feb. 17, 2015

(54) ENABLING HYPERTEXT ELEMENTS TO WORK WITH SOFTWARE APPLICATIONS

(75) Inventor: Oleg B. Rashkovskiy, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 399 days.

(21) Appl. No.: 13/549,835

(22) Filed: Jul. 16, 2012

(65) Prior Publication Data

US 2012/0284612 A1 Nov. 8, 2012

Related U.S. Application Data (63) Continuation of application No. 11/605,664, filed on Nov. 29, 2006, now Pat. No. 8,266,539, which is a continuation of application No. 09/561,054, filed on Apr. 28, 2000, now Pat. No. 7,162,700.

(51) Int. Cl.
*G06F 3/048* (2013.01)
*G06F 17/22* (2006.01)

(52) U.S. Cl.
CPC .................................. *G06F 17/2247* (2013.01)
USPC ........... 715/771; 715/760; 715/763; 715/769; 715/770

(58) Field of Classification Search
None
See application file for complete search history.

(56) References Cited

U.S. PATENT DOCUMENTS

| | | | |
|---|---|---|---|
| 5,384,911 A | 1/1995 | Bloomfield | |
| 5,664,133 A | 9/1997 | Malamud et al. | |
| 5,983,268 A | 11/1999 | Freivald et al. | |
| 6,018,764 A | 1/2000 | Field et al. | |
| 6,018,768 A | 1/2000 | Ullman et al. | |
| 6,081,830 A | 6/2000 | Schindler | |
| 6,205,485 B1 | 3/2001 | Kikinis | |
| 6,338,059 B1 | 1/2002 | Fields et al. | |
| 6,388,714 B1 | 5/2002 | Schein et al. | |
| 6,442,755 B1 | 8/2002 | Lemmons et al. | |
| 6,493,006 B1 | 12/2002 | Gourdol et al. | |
| 6,651,084 B1 | 11/2003 | Kelley et al. | |
| 6,738,982 B1 | 5/2004 | Jerding | |
| 6,757,707 B1 | 6/2004 | Houghton et al. | |
| 6,785,902 B1 | 8/2004 | Zigmond et al. | |
| 6,802,061 B1 | 10/2004 | Parthasarathy et al. | |
| 7,162,700 B1 | 1/2007 | Rashkovskiy | |

FOREIGN PATENT DOCUMENTS

| | | |
|---|---|---|
| EP | 0834798 A2 | 4/1998 |
| JP | 00/307993 A | 11/2000 |
| WO | 98/26584 A1 | 6/1998 |

(Continued)

OTHER PUBLICATIONS

International Search Report dated Jan. 22, 2002, issued in PCT/US01/16104 (4 pages).

(Continued)

*Primary Examiner* — Anil N Kumar
(74) *Attorney, Agent, or Firm* — Trop, Pruner & Hu, P.C.

(57) ABSTRACT

Variables incorporated into a hypertext markup language document enable location of hypertext elements. Once the variable is located, the information contained within the identified hypertext element may be used in other applications. The information may be received, as a recognized input, by the application.

33 Claims, 8 Drawing Sheets

(56) References Cited

FOREIGN PATENT DOCUMENTS

| WO | 99/04561 | A1 | 1/1999 |
|---|---|---|---|
| WO | 99/27690 | A1 | 6/1999 |
| WO | 00/02385 | A1 | 1/2000 |
| WO | 00/08855 | A1 | 2/2000 |
| WO | 00/24195 | A1 | 4/2000 |
| WO | 01/15444 | A1 | 3/2001 |
| WO | 01/40938 | A2 | 6/2001 |

OTHER PUBLICATIONS

International Preliminary Examination Report dated Apr. 19, 2002, issued in PCT/US01/16104 (2 pages).
Microsoft Office Online, "Microsoft Office Assistance: Getting Data From the Web in Excel." http//office.microsoft.com/en-us/assistance/HA010450851033.aspx. Copyright 2005. (3 pages).
Wikipedia.org, "History of Internet Explorer." http//en.wikipedia.org/wiki/History_of_Internet_Explorer. Modified Oct. 13, 2005 (5 pages).
Manger, Jason J., Netscape Navigator, McGraw-Hill Book Company Europe, 1995, pp. 22, 23, 65-71, 158 and 159 (13 pages).
James, Phil, Official Netscape Communicator Cook, Windows Edition. Ventana Communications Group. Copyright 1997, pp. 78, 79, 338-343 and 512-515 (15 pages).
Newton, Harry, "Newton's Telecom Dictionary, 13th Edition," Jan. 1998, p. 339 (3 pages).
"XML Linking Language (XLink)," W3C Working Draft, Jan. 19, 2000 (35 pages).
Kimble, David Michael, U.S. Appl. No. 60/180,085, filed Feb. 3, 2000 entitled "Web browser plug-in for TV".
Nguyen, Nga Maria, U.S. Appl. No. 60/182,822, filed Feb. 16, 2000 entitled "Support for television viewing in a standard web browser".
Ochiai, et al., "Implementation of HomeServer Integrated with Internet," Collected Papers (3) for Discourses at 57th (latter term of 1998) National Convention, Oct. 7, 1998, pp. 3, 157 and 158 (3 pages).
Rashkovskiy, Oleg B., U.S. Appl. No. 09/584,508, filed May 31, 2000 entitled "Using Web-Based Information to Select Television Programs".
Rashkovskiy, Oleg B., U.S. Appl. No. 11/605,664, filed Nov. 29, 2006 entitled "Enabling Hypertext Elements to Work with Software Applications".

ENABLING HYPERTEXT ELEMENTS TO WORK WITH SOFTWARE APPLICATIONS

CROSS-REFERENCE TO RELATED APPLICATIONS

This application is a continuation of U.S. patent application Ser. No. 11/605,664, filed on Nov. 29, 2006, now U.S. Pat. No. 8,266,539 which is a continuation of U.S. patent application Ser. No. 09/561,054, filed on Apr. 28, 2000, which issued as U.S. Pat. No. 7,162,700.

BACKGROUND

This invention relates generally to web pages and particularly to markup languages utilized in connection with the Internet.

In conventional markup languages such as Hypertext Markup Language (HTML) a variety of different graphical and textual displays may be created. Thus, a wide variety of web page formats may be developed using markup languages. The markup language on a server creates a web page that may be viewed on a client using an application called a browser. The client is a processor-based system such as a desktop computer.

Other applications on the user's processor-based system generally do not operate through the browser or use markup languages. Thus, interaction between a markup language document and a non-browser application running on the same processor-based system is relatively limited.

However, generally, there is no way to locate specific features within the code of a markup language document and extract that code for use in other applications. This would be useful since a wide variety of information is available over the Internet which is not readily incorporated from the Internet into other applications such as word processing applications, calendars, electronic mail, address books, tuning and recording television programs, playing video or audio.

Thus, there is a need for a way to locate particular types of material within markup language documents and to use that material in non-browser applications running on the same processor-based system.

DETAILED DESCRIPTION

Figure 1:
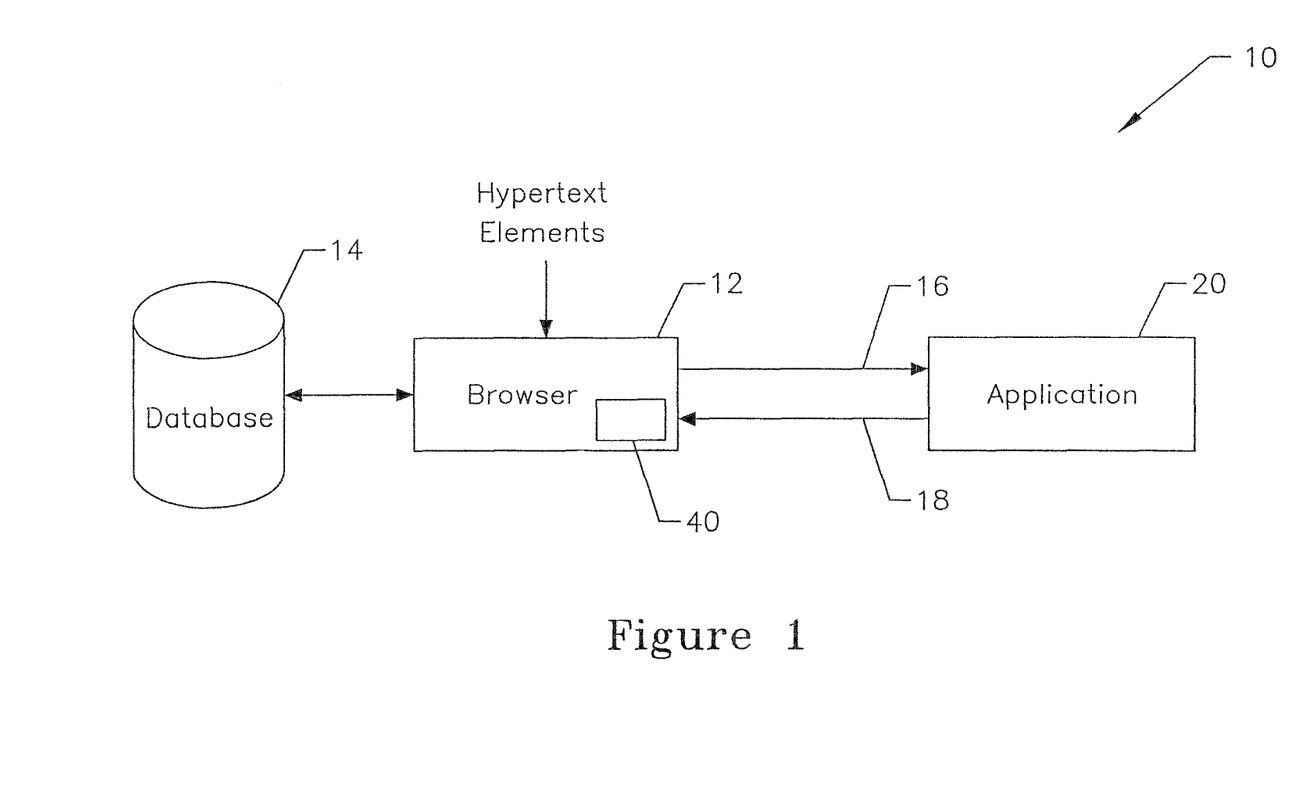
FIG. 1 is a block diagram of one embodiment of the present invention.

Referring to FIG. 1, a processor-based system 10 may use a browser 12 to access hypertext elements. Hypertext elements are the combination of a set of tags, any content contained between the tags and any attributes the tags may have. Hypertext elements may be nested, one within the other. Hypertext elements may exist in various markup languages including HTML, XML (which is a shorthand for Extensible Markup Language) and Standard Generalized Markup Language (SGML).

Standards for markup languages are promulgated by the World Wide Web Consortium (W3C). One such standard is the XHTML 1.0: The Extensible Hypertext Markup Language working draft dated 24 November of 1995 and available from the World Wide Web Consortium (W3C), Massachusetts Institute of Technology, Cambridge, Mass. 02139. Standards for the Wireless Markup Language (WML) for use with cellular telephones are promulgated by the Wireless Application Protocol (WAP) Forum, Ltd. Reading, RG 1-3 BD, United Kingdom.

An "element" is defined by the W3C XHTML 1.0 working draft as a document structuring unit declared in a document type definition. The element's content model is defined in the document type definition and additional semantics may be defined in the prose description of the element. A document type definition (DTD) is a collection of XML declarations that define the legal structure, elements and attributes that are available for use in a document that complies with the DTD.

A "tag" is code that identifies an element in a document for purposes of formatting, indexing and linking information in the documents. In HTML and SGML, a tag is a pair of angle brackets that contain one or more letters or numbers. Usually one pair of angle brackets is placed before and after an element.

In XML for example, any type of data can be given a predetermined form and structure. In XML the tags are user definable. Thus, in one embodiment of the invention, tags may be defined to facilitate the location of particular types of data, such as address data within markup language documents. Once the data may be located, it may then be transferred to data structures associated with a variety of applications such as personal information manager (PIM) applications that use address data for example.

In the following hypothetical XML code for an exemplary web page for a restaurant, the hypertext elements include the tags <A and the </a> as well as the material in between those tags:

<A HREF="http://mapsonus.switchboard.com/bin/maps-
       map/usr=~new/refsrc=CIM.bayinsider?
    AddMarker=AddrStreetLine=532+Columbus
       %09AddrCityLine=San+Francisco,+CA+
       94113%09OnMap=label:Rose+Pistola&
       AddrPickBest=0&MapHeight=160&MapWidth=140"></a>.

Thus, hypertext elements are used by the browser to display a hypertext document as a graphical user interface on a processor-based system's display. The browser 12 may be coupled to a database 14 which contains information, for example, about how the markup language works. Software 40 may included within the browser for purposes to be explained hereinafter.

On the same processor-based system 10 including the browser 12, a variety of applications 20 may also be available. These applications may be word processing applications, personal information manager (PIM) applications that may include calendars or address books, electronic mail applications, spread sheets, and any of a vast array of other applications.

The application 20 may need specific information to fulfill requests from the user. The application 20 may make requests 16 for that information and may receive information 18 in return. For example, an address book application may extract addresses from a web page displayed by the browser 12. Thus, the application 20 may provide the information 18 which identifies the hypertext elements of interest and information 16 associated with the identified hypertext elements may be returned to the application.

In one embodiment of the present invention, a database may be created with associations between hypertext elements such as metadata, XHTML modules or the like, and applications registered with the browser 12. These applications support the hypertext elements as input data.

The hypertext markup language may be written in a way to code, within hypertext elements, variables that may be identified by the browser 12 in response to a request from an application 20. Using the address example, and the hypothetical markup language code provided above, the variable "AddrStreetLine" may be incorporated within the markup language to identify an address that may be sought by an application 20. Thus, by incorporating the variable "AddrStreetLine" as a standard variable, an address book application 20, installed on the system 10, recognizes the data format associated with that variable. The application can use the value of the variable as input data. In fact, the application may be one of a number of applications that support the variable as input data. For example, other applications may also support the same address information using the same address variable. Still other applications may call for still other hypertext elements associated with those predefined variables. In this way, the application 20 may query the browser 12 to identify information useful by the application 20.

Figure 2:
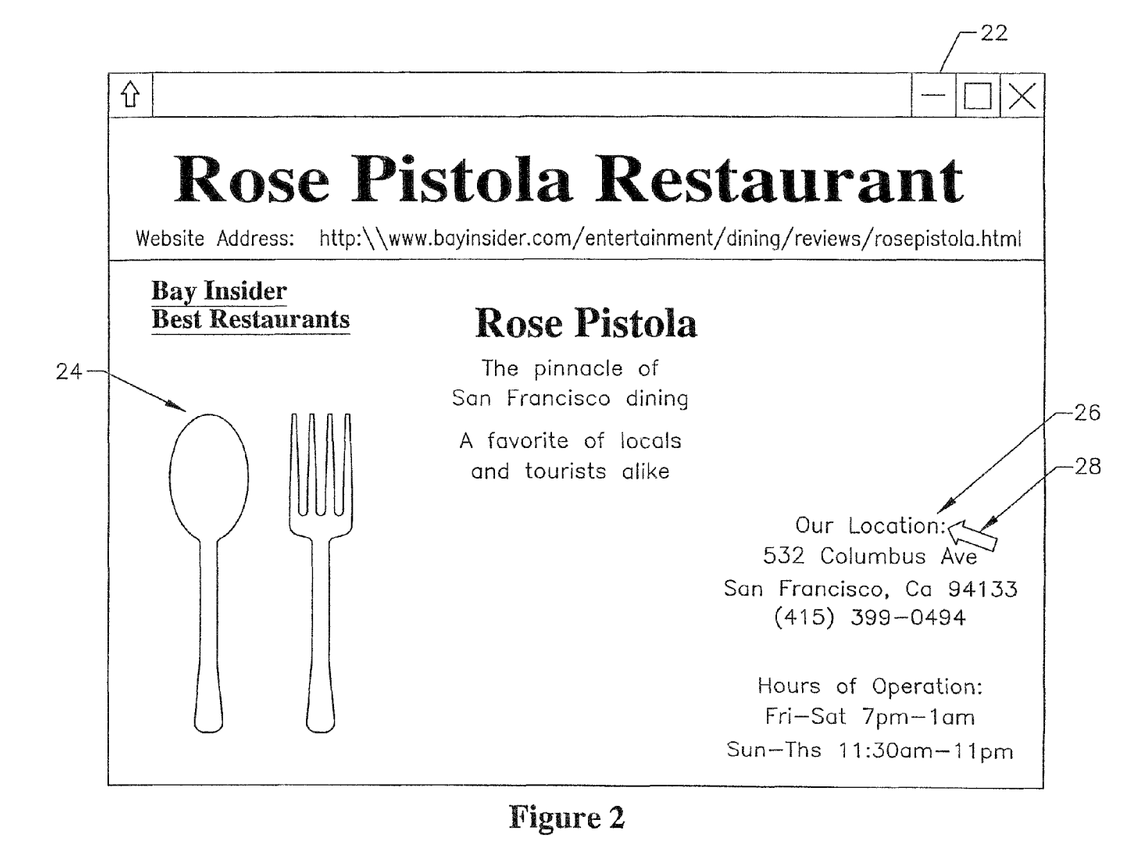
FIG. 2 is a graphical user interface of a conventional web page.

An application 20 can choose a particular variable encoded within the markup language and information associated with that variable may be extracted from a web page and stored in a data structure associated with the application. This may be done by simply mouse clicking on the information of interest on the web page in one embodiment. As shown in FIG. 2, the user may align the cursor 28 over the address information 26 in the graphical user interface 22 operated by a browser 12.

Suppose the user wants to add the address from the web page to an electronic address book. The user may mouse click on that address information on the web page. The web page address information is automatically extracted from the web page and incorporated into a data structure associated with the address book. Again, this extraction is done in software that locates predefined hypertext elements identified within the markup language code.

Figure 3:
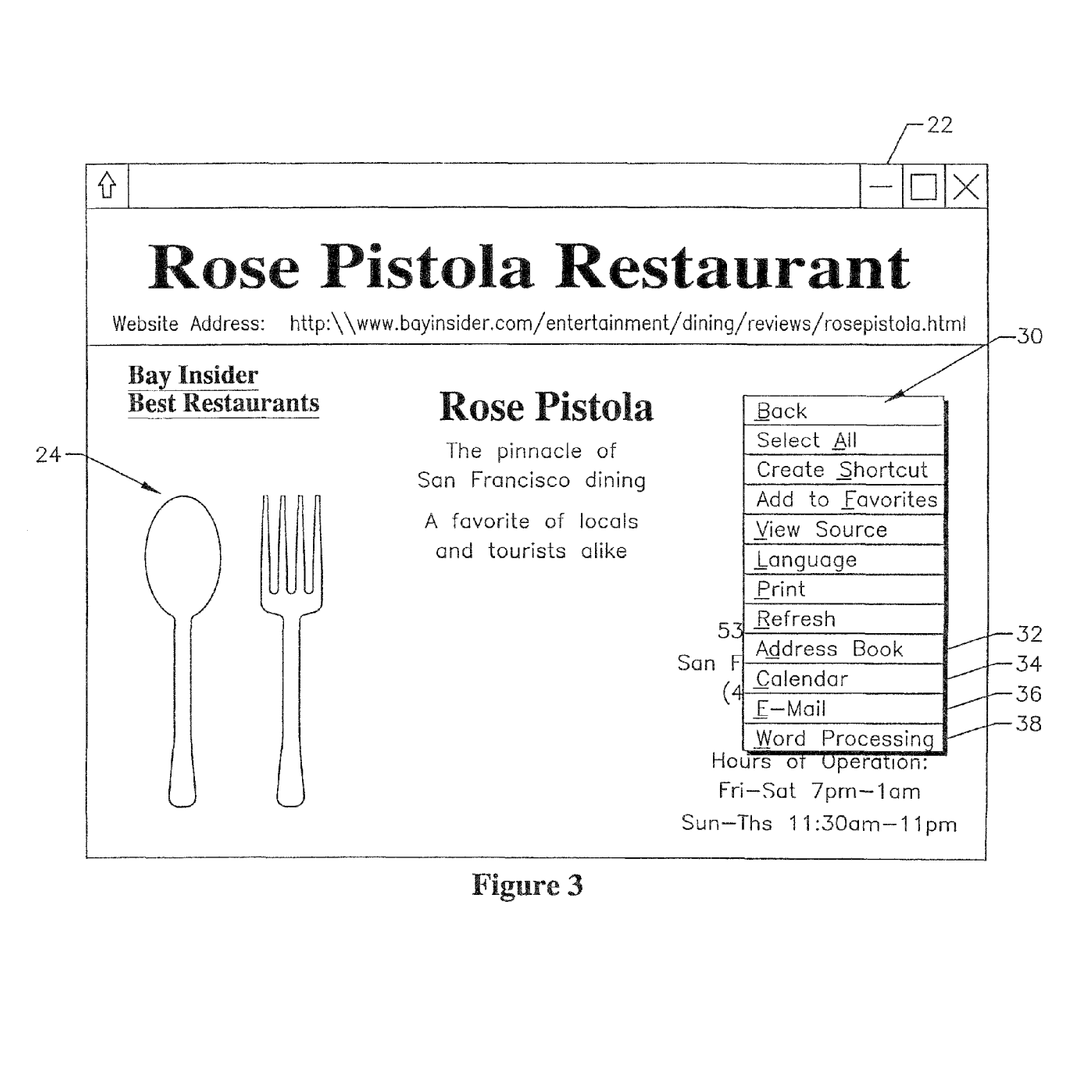
FIG. 3 is a graphical user interface used in accordance with one embodiment of the present invention.

Referring to FIG. 3, when the user mouse clicks on the address information 26 using the cursor 28, a drop down menu 30 appears in one embodiment of the invention. For example, when the user operates the right mouse button, the menu 30 may provide the user with a number of options in addition to those options conventionally displayed in response to our right mouse click. For example, the drop down menu 30 may provide icons such as back, select, create a shortcut, add to favorites, view source, language, print, refresh as well as new selectable icons, address book 32, calendar 34, e-mail 36 and word processing 38.

Each of the icons 32, 34, 36 and 38 facilitates selection of a particular application 20 resident on the system, as the destination for the information extracted from a web page. The icons 32, 34, 36 and 38 are added to the drop down menu 30 when the application associated with each icon registers with the browser.

If the user selects the address book icon 32, for example, by mouse clicking on that icon, the address information 26 may automatically be extracted from the web page interface 22 and stored in memory in association with an address book application. The same operations may be implemented by selecting the calendar icon 34, e-mail icon 36 or the word processing icon 38. Similarly, the user may extract identifiable information from a web page and may incorporate it, through a single mouse click, into an application.

Figure 4:
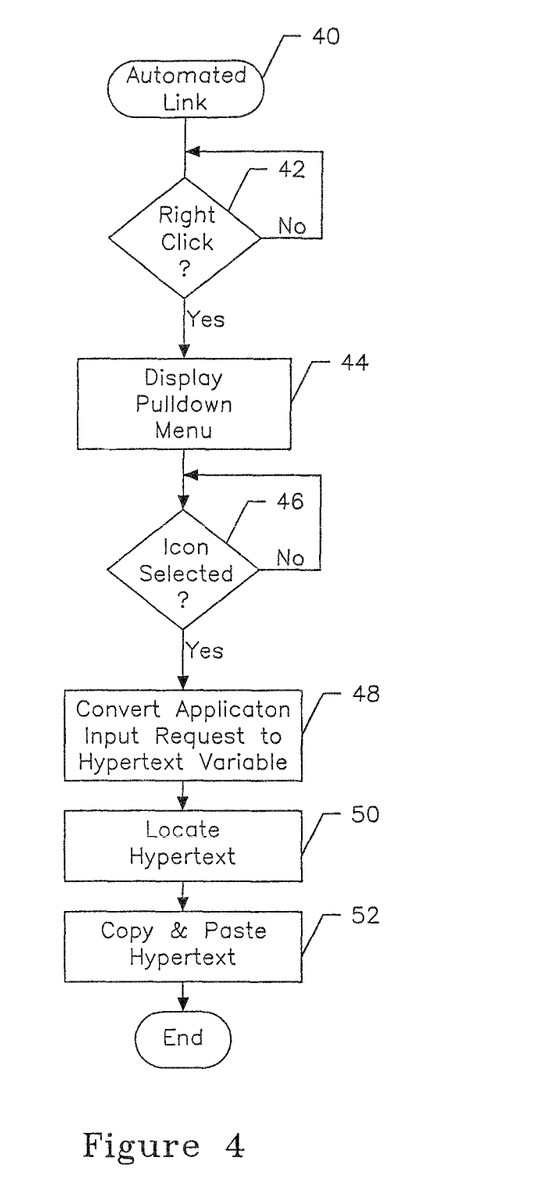
FIG. 4 is a flow chart for software in accordance with one embodiment of the present invention.

Referring next to FIG. 4, the software 40 in accordance with one embodiment of the present invention may be a separate application which is loaded on the same processor-based system as the browser 12 and the application 20. Alternatively, the software 40 may be incorporated into the browser 12 software as supplied by the browser distributor or subsequently plugged into the browser 12.

Initially, the software 40 may detect a right mouse click indicator, as indicated in diamond 42 in one embodiment. Once received, a drop down menu 30 may displayed as indicated in block 34. Next, an icon 32 through 38 may be selected by mouse clicking as indicated in diamond 46. A hypertext variable corresponding to a tag is identified as indicated in block 48. The hypertext element associated with the variable is then located within the web document as indicated in block 50. The corresponding subject matter contained within the hypertext element may be used in the application 20. For example, the element may be automatically copied and pasted into the application 20 as indicated in block 52.

Figure 5:
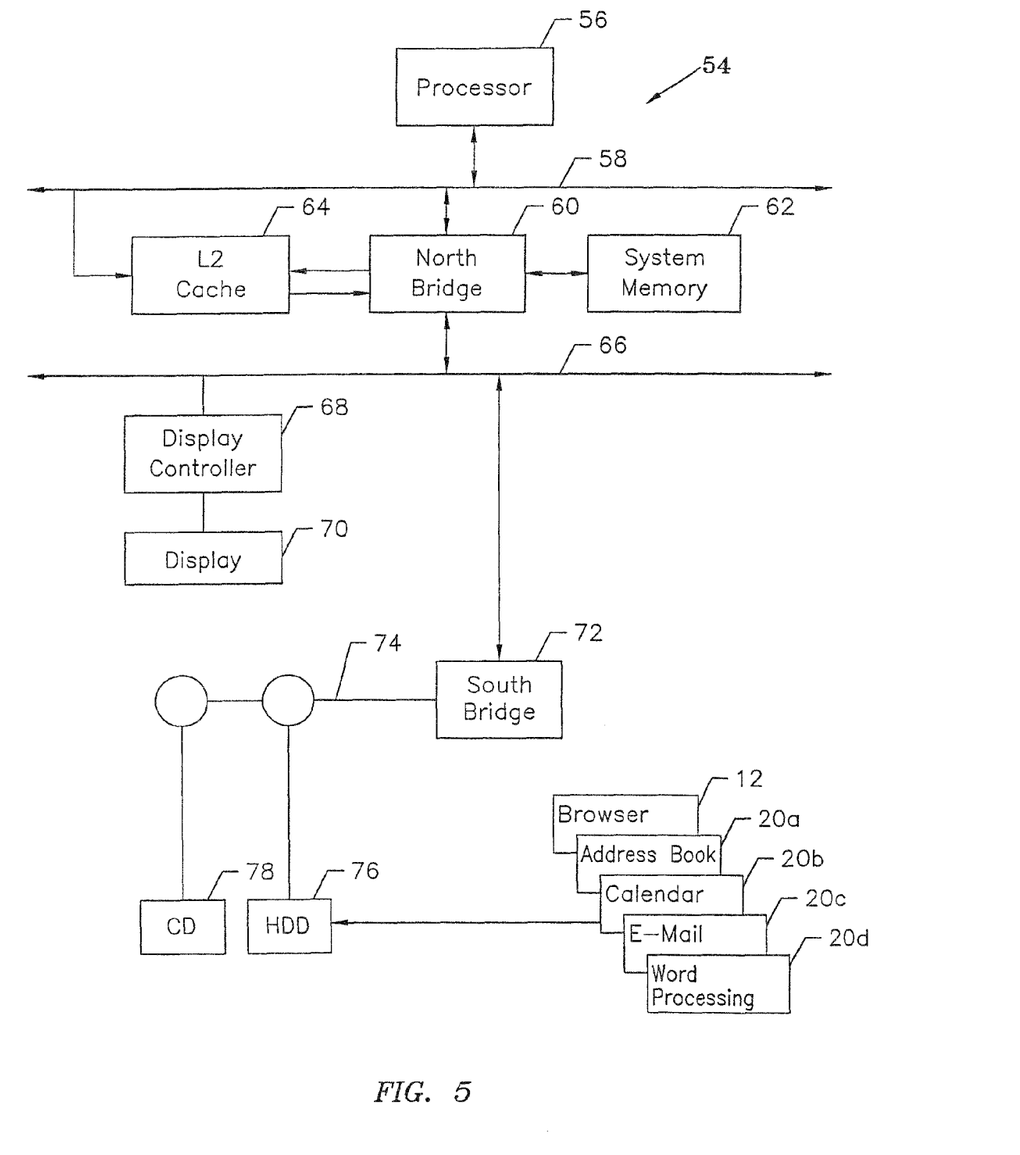
FIG. 5 is a block diagram of hardware in accordance with one embodiment of the present invention.

The client processor-based system 54, shown in FIG. 5, may include a processor 56 coupled to a bus 58 in accordance with one embodiment to the present invention. The bus 58 may be coupled to a north bridge 60 which also couples system memory 62 and L2 cache 64. A bus bridge 60 is in turn coupled to a bus 66. The bus 66 is coupled to a display controller 68 and a display 70 that displays the graphical user interface 22 shown in FIGS. 2 and 3. The bus 66 is also coupled to a south bridge 72. The south bridge may be coupled to a hard disk drive 76 and a compact disk drive 78.

In accordance with one embodiment of the present invention, the browser 12 and various other applications such as an address book application 20a, a calendar application 20b, an e-mail application 20c and a word processing application 20d may all be stored on the hard disk drive 76. Upon execution, these applications may be transferred to system memory 62.

A user may extract predefined information from web pages and automatically incorporate that information into application software resident on the user's processor-based system. In one embodiment of the present invention, this may be accomplished by two mouse clicks.

Figure 6:
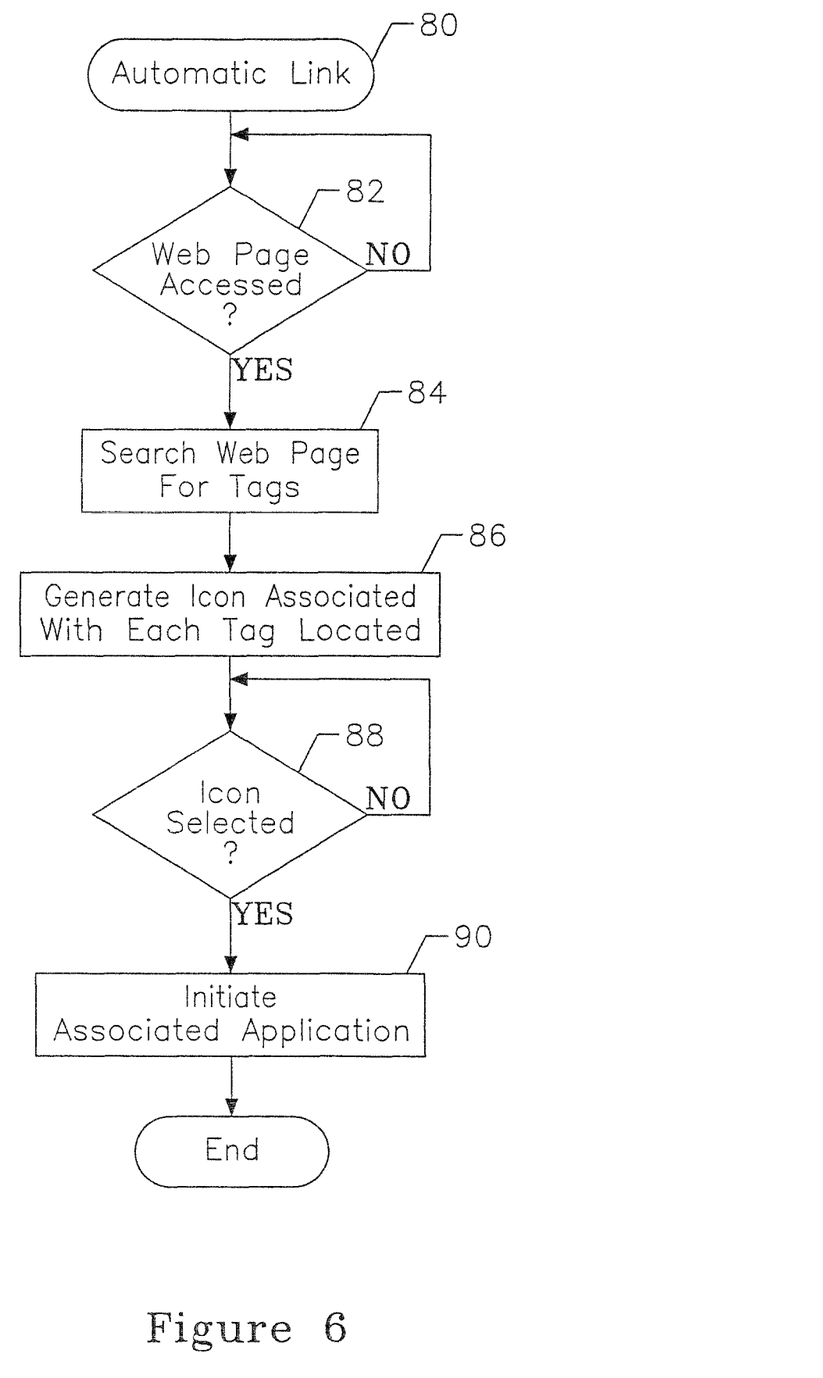
FIG. 6 is a flow chart for another embodiment of the present invention.
Figure 7:
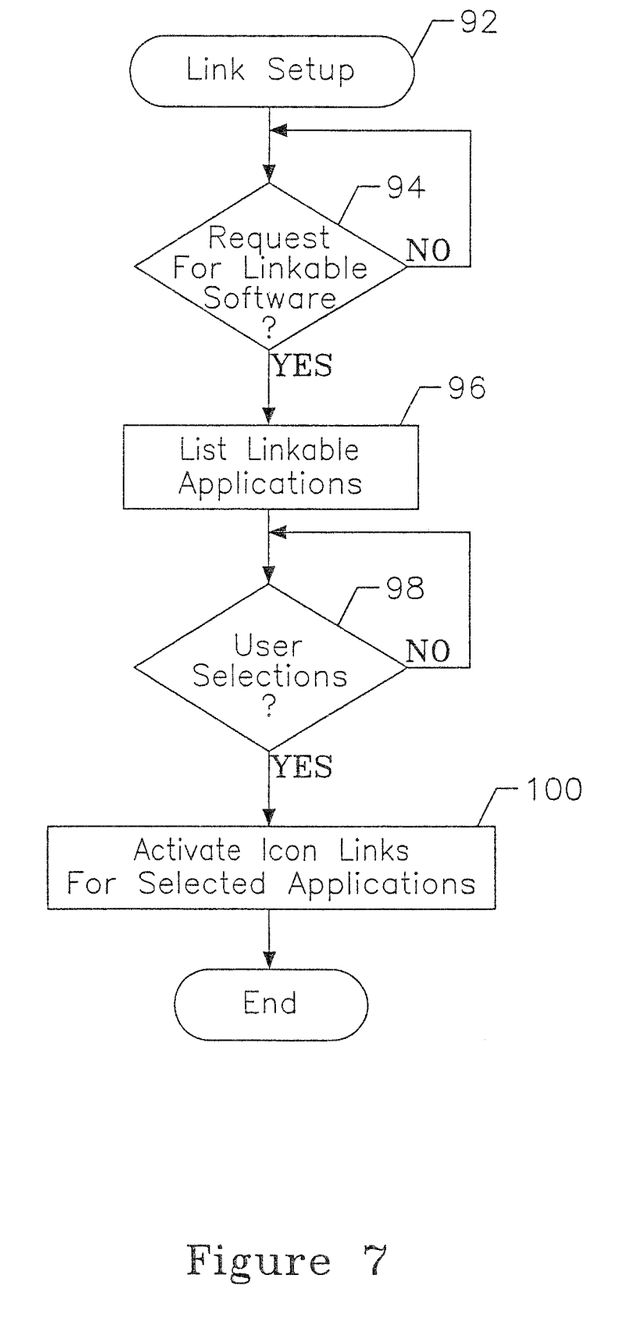
FIG. 7 is a flow chart for the embodiment shown in FIG. 6.
Figure 8:
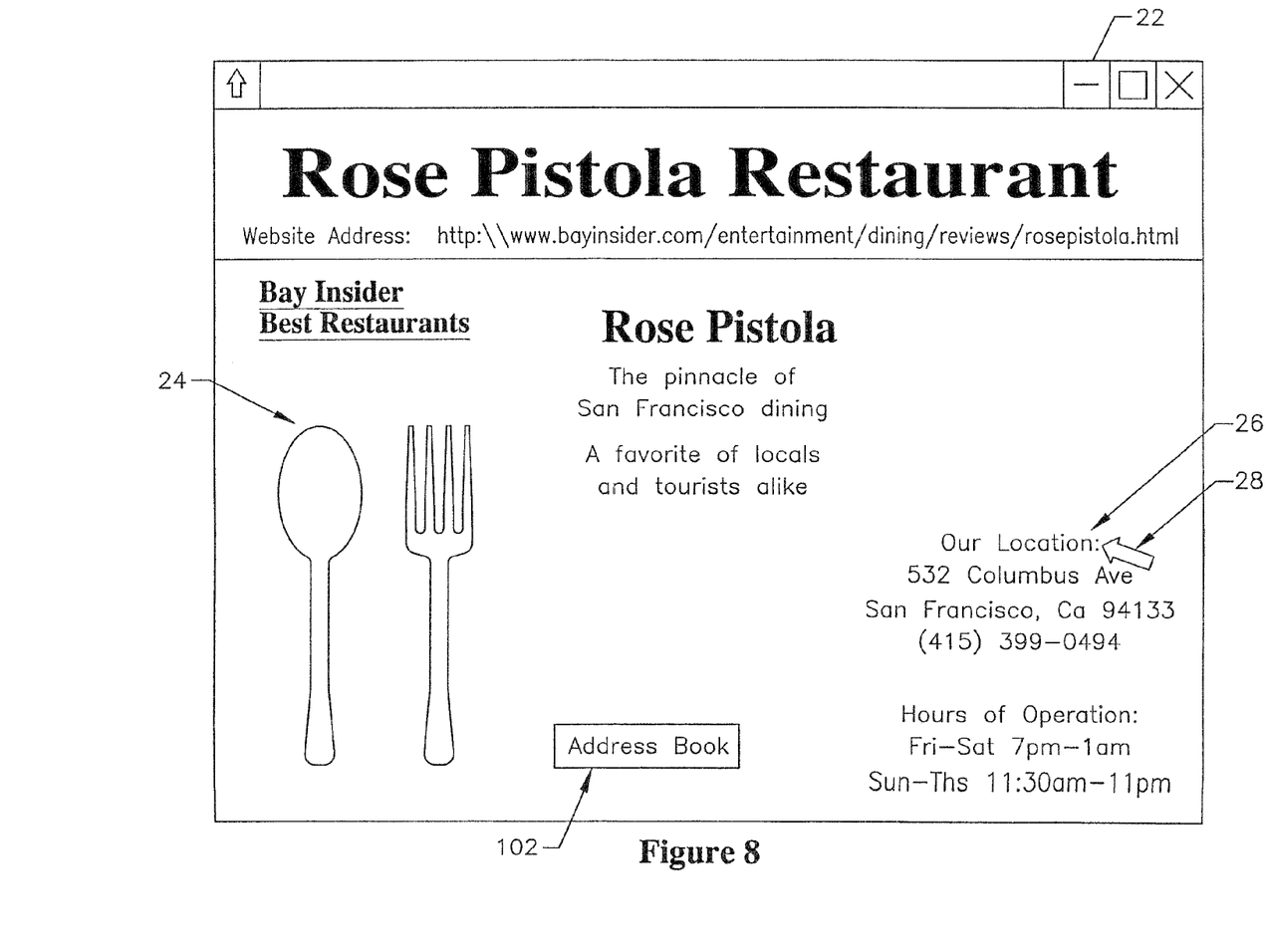
FIG. 8 is a graphical user interface used in accordance with one embodiment of the present invention.

In another embodiment of the present invention, illustrated in FIGS. 6 through 8, the software 80 automatically checks any accessed web page to determine whether the web page includes tags that are compatible with specified applications operative on the processor-based system 54. The presence of those tags in an accessed web page may indicated by overlying an indicative icon on the web page.

Thus, referring to FIG. 6, the software 80 determines when a web page has been accessed, as indicated in diamond 82, by a web browser associated with the system 54. When a web page is accessed, it is automatically searched for tags that are compatible with certain applications registered with the software 80 as indicated in block 84. If tags which are recognized by the system 54 are present, that indicates that those tags may be utilized to provide information to certain applications resident on the system 54. If such tags are identified, an icon may be automatically generated (block 86) to indicate the compatibility of the web page with one or more software applications resident on the system 54.

Thus, an icon 102 may be displayed over the interface 22, as indicated in FIG. 8, by the software 80. In FIG. 8, the icon 102 indicates that the address information 26 on the interface 22 is in a format which is recognized by an address book application that has registered with the software 80.

If the user selects an icon, as indicated in diamond 88 in FIG. 6, the associated application is automatically started. Thus, in one embodiment of the present invention, if the user mouse clicks on the address book icon 102 (FIG. 8), the address book application 20*a* is automatically launched and the address information associated with the tags in the web page are automatically added to the database of the address book software 20*a*.

Link set-up software 92, shown in FIG. 7, may be utilized to register certain applications on the system 54 with the software 80. The user may request an identification of linkable software, as indicated in diamond 94. The user may then be provided with a list of applications currently resident on the user system 54 that work with code forming a given web page as indicated at block 96. Each of those applications may include a code which identifies, to the software 92, that the application is compatible with the software 80. The list may be provided as a graphical user interface listing the linkable applications.

As indicated in diamond 98, a check determines whether the user has selected any of the applications to register them with the automatic link software 80. If so, the icon links for selected applications are automatically activated as indicated in block 100. This means that any accessed web page is automatically searched for tags that are compatible with the activated icon links for the selected application.

Thus, in the example shown in FIG. 8, the address book application 20*a* has registered with the software 80. As a result, each web page is automatically searched for tags that are compatible with the address book application 20*a*. When those tags were located, the address book icon 102 is automatically displayed as an overlay on the interface 22. If the user mouse clicks on the icon 102, the address book application 20*a* may be automatically launched and the data in hypertext element marked by the tags may be added to a database associated with the application 20*a*.

Using embodiments of the present invention, information in hypertext elements that are not hyperlinked to an application may be linked to the application. This may be done without coding hyperlinks into the hypertext document. Information may then be extracted from the hypertext element for use in an application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computing device comprising:
a memory;
a network interface, when operational, configured to receive web page content and to store the web page content into a memory;
a display; and
a processor communicatively coupled to the display, the processor, when operational, configured to:
use a first application to access the web page content to retrieve address information for a second application, the first application to access hypertext markup language (HTML) web content including the address information and the HTML web content accessible to a web browser, the second application comprising a non-browser application;
automatically identify a variable value signifying the address information associated with a hypertext element within a hypertext document for the web page;
automatically extract the address information data;
provide the extracted address information data as input data to the second application; and
request to display an overlaying icon corresponding to the second application on a user interface, the second application to access the address information.

2. The device of claim 1, wherein the second application comprises a non-browser application and comprises an electronic mail application.

3. The device of claim 1, wherein the second application comprises a non-browser application and comprises a calendar application.

4. The device of claim 1, wherein the second application comprises a non-browser application and comprises an address book application.

5. The device of claim 1, wherein the address information comprises one of a street address, a physical location, and an electronic mail address.

6. The device of claim 1, wherein the processor is to identify the variable value in response to a request from the second application.

7. The device of claim 1, wherein the icon comprises an e-mail icon.

8. The device of claim 1, wherein the processor is to store the address information in a data structure associated with the second application.

9. The device of claim 1, wherein the processor is also to automatically locate the hypertext element in the hypertext document in response to an indication provided in response to a display of the webpage.

10. The device of claim 9, wherein the processor is to automatically locate the hypertext element in response to a mouse click.

11. The device of claim 9, wherein the processor is to automatically locate the hypertext element in response to selection of a portion of the displayed web page.

12. The device of claim 1, wherein the processor is to automatically request to display the icon in response to identification of the hypertext element.

13. The device of claim 1, wherein the processor is also to automatically locate the hypertext element in response to a request from the second application to automatically identify the variable value.

14. The device of claim 1, wherein the processor is to request to display an overlaying icon in response to a user input.

15. A non-transitory computer-readable medium comprising instructions stored thereon, which when executed by a computer, cause the computer to:
use a first software module to access the web page content to retrieve address information for a second software module, the first software module to access hypertext markup language (HTML) web content including the address information and the HTML web content accessible to a web browser, wherein the second software module comprises a non-browser application;
automatically identify a variable value signifying the address information associated with a hypertext element within a hypertext document for the web page;
automatically extract the address information data;
provide the extracted address information data as input data to the second software module; and request to display an overlaying icon corresponding to the second software module on a user interface, the second software module to access the address information.

16. The medium of claim 15, wherein the second software comprises a non-browser application and comprises one or more of an electronic mail application, a calendar application, and an address book application.

17. The medium of claim 15, wherein the address information comprises one of a street address, a physical location, and an electronic mail address.

18. The medium of claim 15, wherein when the computer is to identify the variable value, the computer is to identify the variable value in response to a request from the second software.

19. The medium of claim 15, wherein the icon comprises an e-mail icon.

20. The medium of claim 15, wherein the computer is to store the address information in a data structure associated with the second software module.

21. The medium of claim 15, wherein the computer is also to automatically locate the hypertext element in the hypertext document in response to an indication provided in response to a display of the web page.

22. The medium of claim 21, wherein the computer is to automatically locate the hypertext element in response to a mouse click.

23. The medium of claim 21, wherein the computer is to automatically locate the hypertext element in response to selection of a portion of the displayed web page.

24. The medium of claim 15, wherein the computer is to automatically request to display the icon in response to identification of the hypertext element.

25. The medium of claim 15, wherein the computer is also to automatically locate the hypertext element in response to a request from the second software module to automatically identify the variable value.

26. The medium of claim 15, wherein the computer is to request to display an overlaying icon is in response to a user input.

27. A computer-implemented method comprising:
using a first software module to access the web page content to retrieve address information for a second software module, the first software module to access hypertext markup language (HTML) web content including the address information and the HTML web content accessible to a web browser, wherein the second software module comprises a non-browser application;
automatically identifying a variable value signifying the address information associated with a hypertext element within a hypertext document for the web page;
automatically extracting the address information data;
providing the extracted address information data as input data to the second software module; and
requesting to display an overlaying icon corresponding to the second software module on a user interface, the second software module to access the address information.

28. The method of claim 27, wherein the second software module comprises a non-browser application and comprises one or more of an electronic mail application, a calendar application, and an address book application.

29. The method of claim 27, wherein the address information comprises one of a street address, a physical location, and an electronic mail address.

30. The method of claim 27, wherein the identifying a variable value comprises identifying a variable value in response to a request from the second software.

31. The method of claim 27, wherein the icon comprises an e-mail icon.

32. The method of claim 27, further comprising automatically locating the hypertext element in the hypertext document in response to an indication provided in response to a display of the web page.

33. The method of claim 32, wherein automatically locate the hypertext element occurs in response to selection of a portion of the displayed web page.

* * * * *